United States Patent
Börzsei et al.

(10) Patent No.: US 9,112,871 B2
(45) Date of Patent: Aug. 18, 2015

(54) METHOD AND APPARATUS FOR PROVIDING SHARED SERVICES

(75) Inventors: Mihály László Börzsei, Tampere (FI); Seamus Moloney, Riihimäki (FI)

(73) Assignee: Core Wireless Licensing S.a.r.l, Luxembourg (LU)

( * ) Notice: Subject to any disclaimer, the term of this patent is extended or adjusted under 35 U.S.C. 154(b) by 824 days.

(21) Appl. No.: 12/372,620

(22) Filed: Feb. 17, 2009

(65) Prior Publication Data
US 2010/0210265 A1 Aug. 19, 2010

(51) Int. Cl.
*H04M 3/42* (2006.01)
*H04L 29/08* (2006.01)

(52) U.S. Cl.
CPC .......... *H04L 67/1008* (2013.01); *H04L 67/101* (2013.01); *H04L 67/1002* (2013.01); *H04L 67/1034* (2013.01)

(58) Field of Classification Search
CPC ............... H04L 41/0213; H04L 29/08072; H04L 29/06
USPC .......... 455/435.1, 414.1–414.2; 709/202, 223
See application file for complete search history.

(56) References Cited

U.S. PATENT DOCUMENTS

| | | | |
|---|---|---|---|
| 7,149,534 B2 | 12/2006 | Bloebaum et al. | |
| 2002/0002602 A1 | 1/2002 | Vange et al. | |
| 2004/0049345 A1* | 3/2004 | McDonough et al. | 702/12 |
| 2004/0092260 A1* | 5/2004 | Thubert et al. | 455/435.1 |
| 2006/0190580 A1 | 8/2006 | Shu et al. | |
| 2006/0200541 A1* | 9/2006 | Wikman et al. | 709/223 |
| 2007/0214209 A1* | 9/2007 | Maeda | 709/202 |
| 2007/0233746 A1 | 10/2007 | Garbow et al. | |
| 2007/0255852 A1 | 11/2007 | McBride et al. | |
| 2009/0082051 A1 | 3/2009 | Ruotsi | |
| 2009/0164583 A1 | 6/2009 | Zhu | |

FOREIGN PATENT DOCUMENTS

| | | |
|---|---|---|
| WO | WO 01/82023 A2 | 11/2001 |
| WO | 2006043141 | 4/2006 |
| WO | WO 2006/043141 A1 | 4/2006 |
| WO | 2007088333 A1 | 8/2007 |

OTHER PUBLICATIONS

Satish Narayana Srirama, Matthias Jarke, Wolfgang Prinz, Mobile Web Service Provisioning, In proceedings of the Advanced International Conference on Telecommunications and International Conference on Internet and Web Applications and Services (Gosier, Guadeloupe, France, Feb. 19-25, 2006, 120-120), Institute of Electrical and Electronics Engineers, USA, 2006.

(Continued)

*Primary Examiner* — Wayne Cai
(74) *Attorney, Agent, or Firm* — Core Wireless Licensing

(57) ABSTRACT

An approach is provided for shared mobile web services. A community including multiple mobile web servers providing a shared web service is designated. In the event one mobile web server is unavailable to service a request directed to the shared web service, another mobile web server is selected to provide the shared web service.

17 Claims, 9 Drawing Sheets

(56) References Cited

OTHER PUBLICATIONS

Boualem Benatallah, Marlon Dumas, Quan Z. Sheng, Anne H.H. Ngu, Declarative Composition and Peer-to-Peer Provisioning of Dynamic Web Services, In proceedings of 18th International Conference on Data Engineering (ICDE), (San Jose CA, USA. Feb. 29-Mar. 1, 2002, 297)Institute of Electrical and Electronics Engineers, USA, 2002.

Hung et al., Mobile distributed web server system. In: Cyber Worlds, 2002. Proceedings. First International Symposium, Nov. 6-8, 2002, pp. 346-353.

International Search Report and Written Opinion of corresponding International Application No. PCT/FI2009/050775 dated Feb. 12, 2010.

EP Extended Search Report dated Jul. 6, 2012; from counterpart EP Application No. EP 09840261.3.

Hassan, Mahibub; "Mobile Web Service Provisioning in Peer to Peer Environments"; Service-Oriented Computing and Applications, 2009 IEEE Int'l Conference; Jan. 14, 2009, pp. 1-4.

Arrufat M. et al.; "POPEYE: A Simple and Reliable Collaborative Working Environment over Mobile Ad-Hoc Networks," Int'l Conference on Collaborative Computing: Networking, Appls. and Worksharing (2007), Collaboratecom 2007, Nov. 12, 2007, pp. 399-407.

* cited by examiner

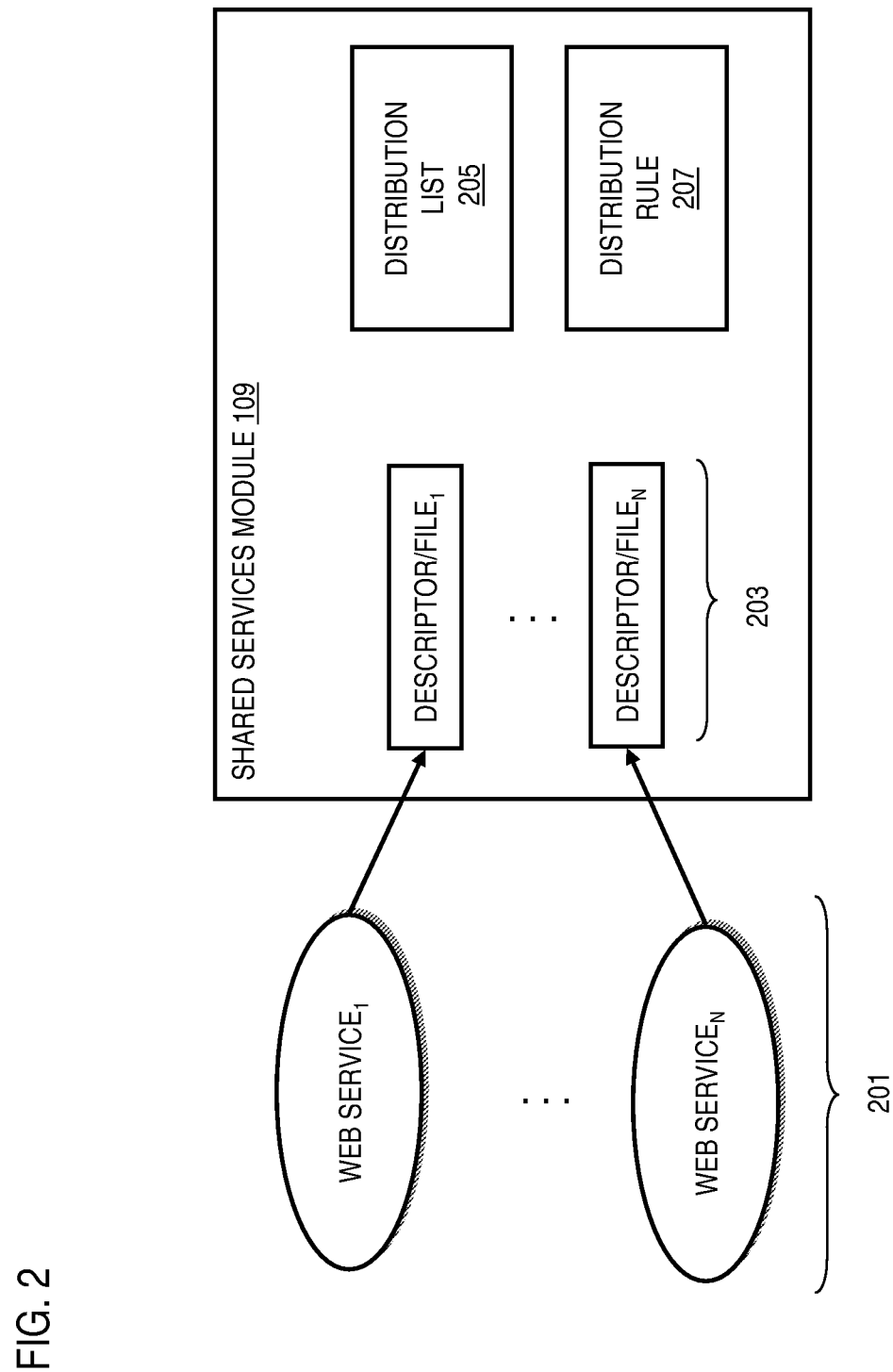

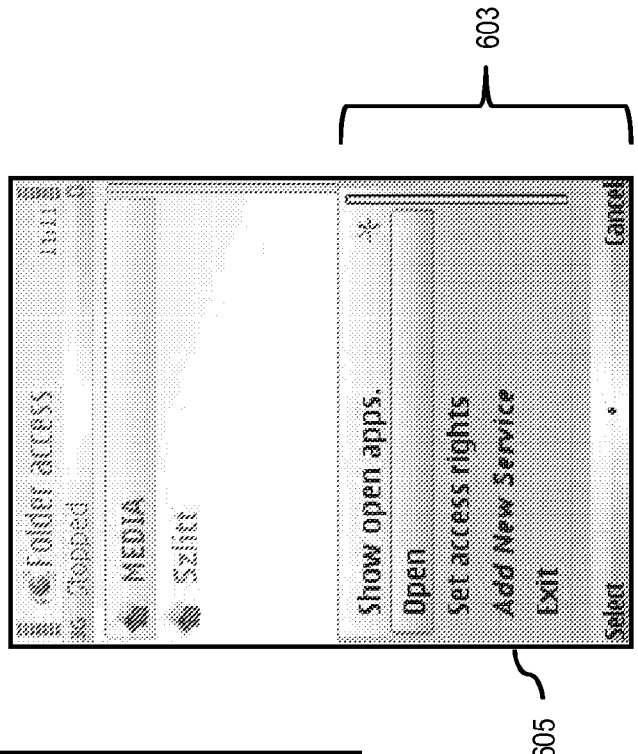
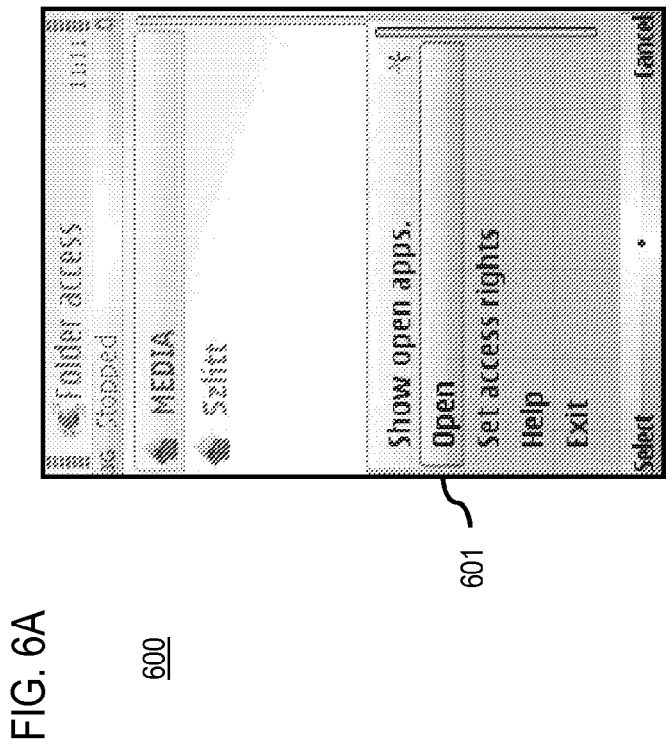
FIG. 6A
FIG. 6B

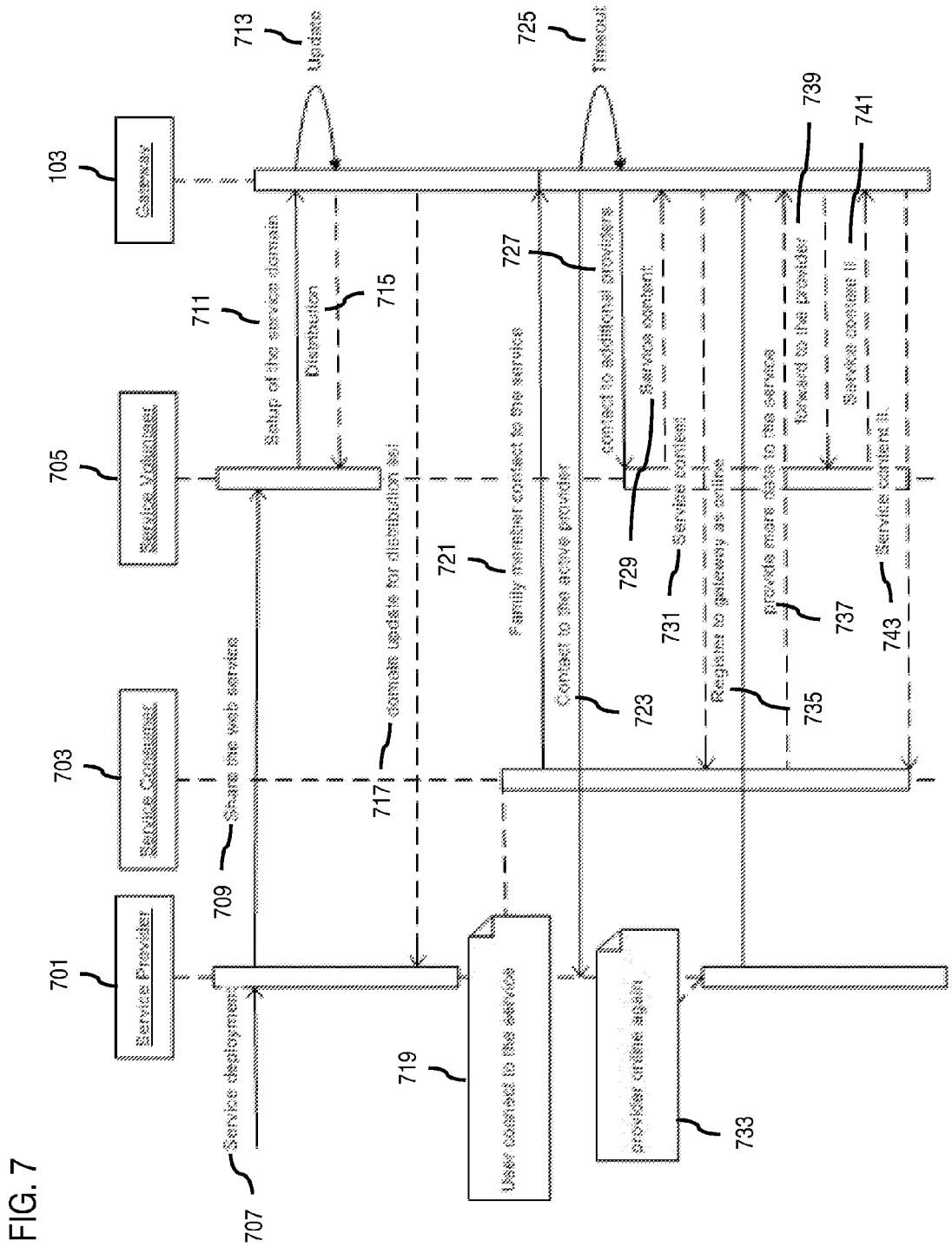

METHOD AND APPARATUS FOR PROVIDING SHARED SERVICES

BACKGROUND

Wireless (e.g., cellular) service providers and device manufacturers are continually challenged to deliver value and convenience to consumers by, for example, providing compelling network services, applications, and content. In light of an increasingly web-centric culture, one emerging service is the use of wireless devices to provide mobile web services. These services, for example, include hosting web applications and content on a mobile handset for sharing with other users. However, limited resources (e.g., bandwidth, processing power, availability of the mobile web server) within the wireless environment pose significant problems to implementing web services on mobile devices.

SOME EXEMPLARY EMBODIMENTS

Therefore, there is a need for an approach for providing shared mobile web services.

According to one embodiment, a computer-readable storage medium carrying one or more sequences of one or more instructions which, when executed by one or more processors, cause the one or more processors to designate a plurality of mobile servers as a community for sharing a service. The shared service is provided by one of the mobile servers acting as a primary server. The one or more processors are also caused to detect unavailability of the primary server to provide the shared service. The one or more processors are further caused to select another one of the mobile servers in the community as a secondary server to provide the shared service.

According to another embodiment, an apparatus comprising a processor and a memory storing executable instructions that if executed cause the apparatus to designate a plurality of mobile servers as a community for sharing a service. The shared service is provided by one of the mobile servers acting as a primary server. The processor and the memory are also caused to detect unavailability of the primary server to provide the shared service. The processor and the memory are further caused to select another one of the mobile servers in the community as a secondary server to provide the shared service.

According to another embodiment, a computer-readable storage medium carrying one or more sequences of one or more instructions which, when executed by one or more processors, cause the one or more processors to initiate transmission of content associated with the shared service to a mobile device configured to operate within the wireless network and to request the shared service.

According to another embodiment, an apparatus comprising a processor and a memory storing executable instructions that if executed cause the apparatus to initiate registration of a shared service with a gateway, wherein the shared service is provided over a wireless network. The processor and the memory are also caused to initiate storage of service descriptor information about the shared service. The processor and the memory are further caused to initiate updating or synchronization of the service descriptor information based on a control message received from the gateway. The processor and the memory are further caused to provide the shared service in response to the update or synchronization of the service description information.

Still other aspects, features, and advantages of the invention are readily apparent from the following detailed description, simply by illustrating a number of particular embodiments and implementations, including the best mode contemplated for carrying out the invention. The invention is also capable of other and different embodiments, and its several details can be modified in various obvious respects, all without departing from the spirit and scope of the invention. Accordingly, the drawings and description are to be regarded as illustrative in nature, and not as restrictive.

BRIEF DESCRIPTION OF THE DRAWINGS

The embodiments of the invention are illustrated by way of example, and not by way of limitation, in the figures of the accompanying drawings:

FIG. 2 is a diagram of components of a shared services module, according to an exemplary embodiment;

FIGS. 6A and 6B are diagrams of a user interface utilized in the process of FIG. 5, according to an exemplary embodiment;

FIG. 7 is a ladder diagram that illustrates a sequence of messages and processes for providing a shared web service, according to an exemplary embodiment;

DESCRIPTION OF PREFERRED EMBODIMENT

A method and apparatus for providing shared services are disclosed. In the following description, for the purposes of explanation, numerous specific details are set forth in order to provide a thorough understanding of the embodiments of the invention. It is apparent, however, to one skilled in the art that the embodiments of the invention may be practiced without these specific details or with an equivalent arrangement. In other instances, well-known structures and devices are shown in block diagram form in order to avoid unnecessarily obscuring the embodiments of the invention.

Although various exemplary embodiments are described with respect to sharing web services within a wireless network environment, it is contemplated that the approach for sharing services described herein may be used within any type of communication system or network, and other services or applications.

Figure 1:
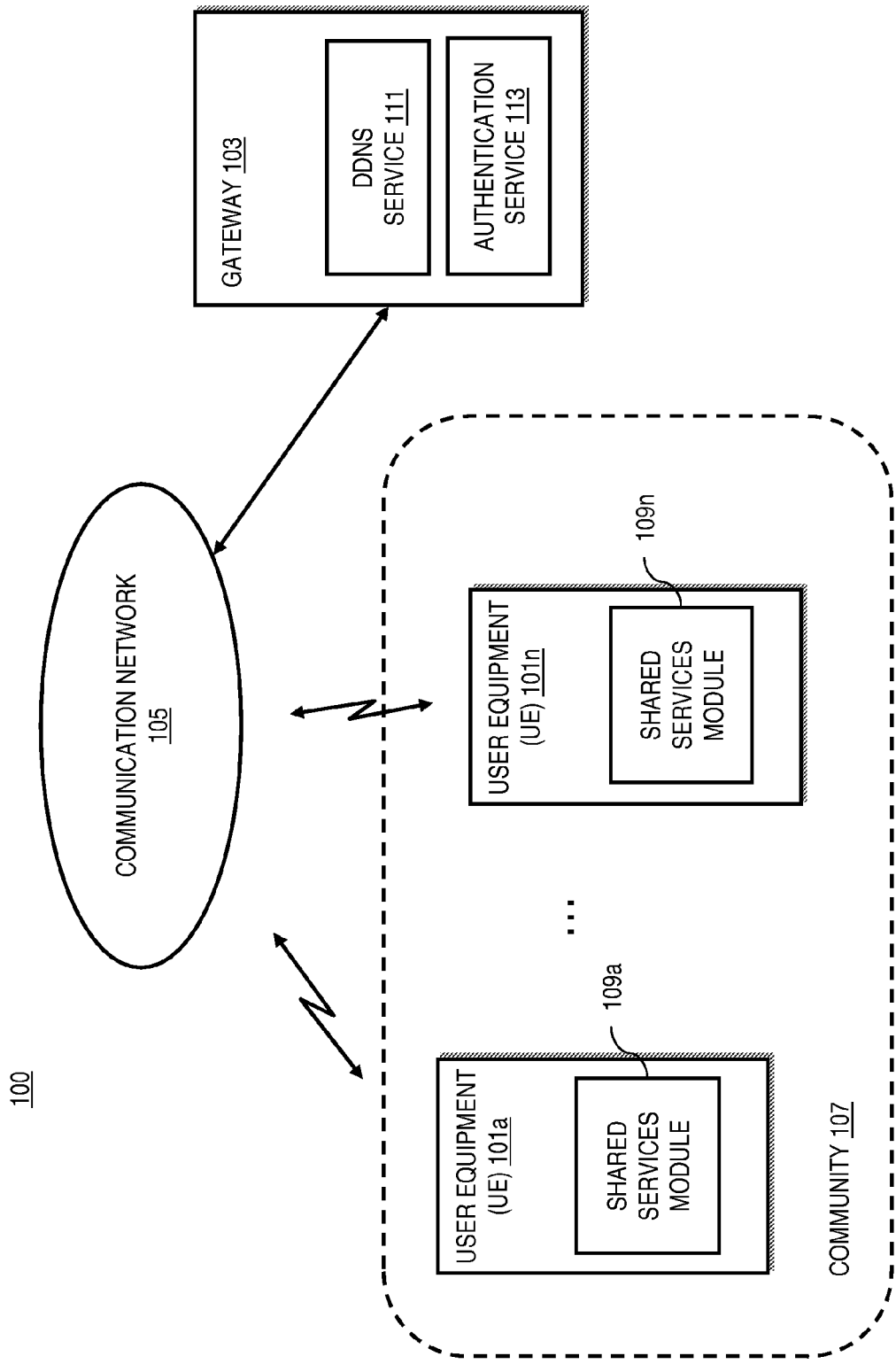
FIG. 1 is a diagram of a communication system capable of providing shared services, according to an exemplary embodiment.

FIG. 1 is a diagram of a communication system capable of providing shared services, according to an exemplary embodiment. As shown in FIG. 1, a system 100 comprises one or more user equipment (UEs) (e.g., UEs 101*a*-101*n*) having connectivity to a gateway 103 via a communication network 105. The UEs 101*a*-101*n* are any type of fixed terminal, mobile terminal, or portable terminal including desktop computers, laptop computers, handsets, stations, units, devices, multimedia tablets, Internet nodes, communicators, Personal Digital Assistants (PDAs), or any combination thereof. It is also contemplated that the UEs 101*a*-101*n* can support any type of interface to the user (such as "wearable" circuitry, etc.). The UEs 101a-101n act as mobile web servers to permit mobile hosting of web services for sharing within a community 105 of the UEs 101a-101n.

By way of example, the communication network 105 of system 100 includes one or more networks such as a data network (not shown), a wireless network (not shown), a telephony network (not shown), or any combination thereof. It is contemplated that the data network may be any local area network (LAN), metropolitan area network (MAN), wide area network (WAN), the Internet, or any other suitable packet-switched network, such as a commercially owned, proprietary packet-switched network, e.g., a proprietary cable or fiber-optic network. In addition, the wireless network may be, for example, a cellular network and may employ various technologies including enhanced data rates for global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, mobile ad-hoc network (MANET), and the like.

As discussed previously, implementing mobile web services within a wireless environment taxes the limited resources (e.g., bandwidth, processing power, availability of the mobile server, etc.) that are available within the environment. For instance, running a photo-sharing web service on a mobile handset can potentially overwhelm the capabilities of the handset when multiple users are connected, or when large pictures files are being transferred. The system 100 addresses this problem by designating a community 107 of mobile web servers (e.g., UEs 101a-101n) that redundantly provide one or more web services. More specifically, a gateway 103 designates multiple UEs 101a-101n as a community 107 for sharing a web service. The gateway 103 designates one UE 101 to act as a primary server for the web service and may designate one or more other UEs 101 as secondary servers. When a service request is received, the gateway 105 detects whether the designated primary server is available. It is contemplated that availability depends on factors such as whether the UE 101 acting as the primary server is online (e.g., powered on and connected to the data network) and the number of other requests the primary server is handling. If the primary server is not available, the gateway dynamically selects a secondary server to service the request.

As shown in FIG. 1, the UEs 101a-101n each include, for instance, a shared services module 103 to coordinate the sharing of a web service with the gateway 105. In exemplary embodiments, the shared services module 103 contains a listing of web services available on the UE 101. For example, the web service listing includes a service descriptor and associated files (e.g., data or content files) for providing the service. The service descriptor, for instance, includes a list of service items (e.g., files, logs, scripts, etc. associated with the service). It is contemplated that the service items may include the files installed as part of the service, as well other files available to the UE 101 (e.g., personal information management (PIM) files resident on the device). The service descriptor also includes a list of dependencies (i.e., additional services or modules that are installed with the service). For example, dependencies may include a SQL database service or an Apache module. In addition, the service descriptor includes configuration settings for setting up the web service when it is first installed on the UE 101. The service configuration settings, for instance, may contain information to register the service with the gateway 103 or information on any actions needed from the user or the UE 101 to complete installation of the service (e.g., confirm privacy settings, etc.).

To assist the UEs 101a-101n in providing shared services, the gateway 103, for example, includes a dynamic domain name server (DDNS) service 111 and an authentication service 113. The DDNS service 111 enables the gateway 103 to maintain a list of domains, subdomains, and mobile servers associated with a web service. In exemplary embodiments, the DDNS service 111 designates a primary server and secondary servers for a web service. For example, as each mobile server (e.g., a UE 101) enters or leaves the communication network 105, the mobile server registers or deregisters with the DDNS service 111. In the event the mobile server is unable to deregister before leaving the number (e.g., when the server suddenly loses power), the DDNS service 111 provides for a timeout period. For instance, if the mobile server does not respond during the timeout period, the DDNS service 111 assumes the mobile server is unavailable.

The authentication service 113 enables the gateway to authenticate the mobile servers within the community 105 as well as the users of the web services provided by the mobile servers. It is contemplated that any type of authentication scheme (e.g., a user name and password, a key access number, a unique machine identifier (e.g., MAC address), and the like, as well as combinations thereof) may be used to ensure that only authorized mobile servers and users have access to the web services of system 100.

By way of example, the UEs 101a-101n communicate with other devices (i.e., network nodes) on the communication network 105 (e.g., the gateway 103, users of the web services) using standard protocols. In this context, a protocol includes a set of rules defining how the network nodes within the communication network 105 interact with each other based on information sent over the communication links. The protocols are effective at different layers of operation within each node, from generating and receiving physical signals of various types, to selecting a link for transferring those signals, to the format of information indicated by those signals, to identifying which software application executing on a computer system sends or receives the information. The conceptually different layers of protocols for exchanging information over a network are described in the Open Systems Interconnection (OSI) Reference Model. The OSI Reference Model is generally described in more detail in Section 1.1 of the reference book entitled "Interconnections Second Edition," by Radia Perlman, published September 1999.

Communications between the network nodes are typically effected by exchanging discrete packets of data. Each packet typically comprises (1) header information associated with a particular protocol, and (2) payload information that follows the header information and contains information that may be processed independently of that particular protocol. In some protocols, the packet includes (3) trailer information following the payload and indicating the end of the payload information. The header includes information such as the source of the packet, its destination, the length of the payload, and other properties used by the protocol. Often, the data in the payload for the particular protocol includes a header and payload for a different protocol associated with a different, higher layer of the OSI Reference Model. The header for a particular protocol typically indicates a type for the next protocol contained in its payload. The higher layer protocol is said to be encapsulated in the lower layer protocol. The headers included in a packet traversing multiple heterogeneous networks, such as the Internet, typically include a physical (layer 1) header, a data-link (layer 2) header, an internetwork (layer 3) header and a transport (layer 4) header, and various application headers (layer 5, layer 6 and layer 7) as defined by the OSI Reference Model.

FIG. 2 is a diagram of components of a shared services module, according to an exemplary embodiment. By way of example, the shared services module 109 includes one or more components for providing a shared web service. In this embodiment, the shared services module 109 includes a list of web services 201 offered by a mobile server (e.g., a UE 101). As discussed with respect to FIG. 1, a web service listing includes a service descriptor and associated files 203.

Each web service 201 is also associated with a distribution list 205 and a distribution rule 207. The distribution list 205 identifies all of the mobile servers (e.g., UEs 101a-101n) that are sharing a particular service. In exemplary embodiments, a mobile server may dynamically enable or disable a particular service at will. To keep track of the status of a particular mobile server, the distribution list 205 contains a list of mobile servers along information on whether each server has enabled or disabled the service. For example, family members participate in a photo-sharing web service with each other. This service enables each member to share pictures taken from the mobile device's camera. However, while on vacation, certain members of the family have been designated as the official photographers for the photo-sharing web service. Accordingly, the members who are not the designated photographers temporarily disable their photo-sharing web service. The distribution list 205 is used to track which family members are actively sharing the service.

In exemplary embodiments, the distribution rule 207 specifies how the gateway 103 should act when a particular web service is shared. The distribution rule 207, for instance, tells the gateway 103 whether to create a new domain or a new subdomain when a particular web service is shared. For example, a community 105 of mobile servers has already created a domain name (e.g., "community1.com") and has initiated sharing a calendar web service. The distribution rule 207 associated with the calendar service directs the gateway 103 to create a new subdomain (e.g., "calendar.community1.com") because a domain already exists. If there were no existing domain name, the gateway 103 may be directed to create both a new domain and subdomain or a new domain only.

In certain embodiments, the distribution rule 207 may also be used to direct service requests to one or more particular mobile servers. For instance, the rule 207 may specify that service requests should go to a secondary server before the primary server, even though, by default, the gateway 103 directs service requests to the primary server before the secondary servers. It is also contemplated that a distribution rule 207 may be used to manually direct incoming service requests to another server using a distribution rule 207. For example, a first user would like to temporarily to suspend a web service. To do this, the first user may create a new distribution rule 207 for the web service to direct the service requests to another mobile server temporarily.

Figure 3:
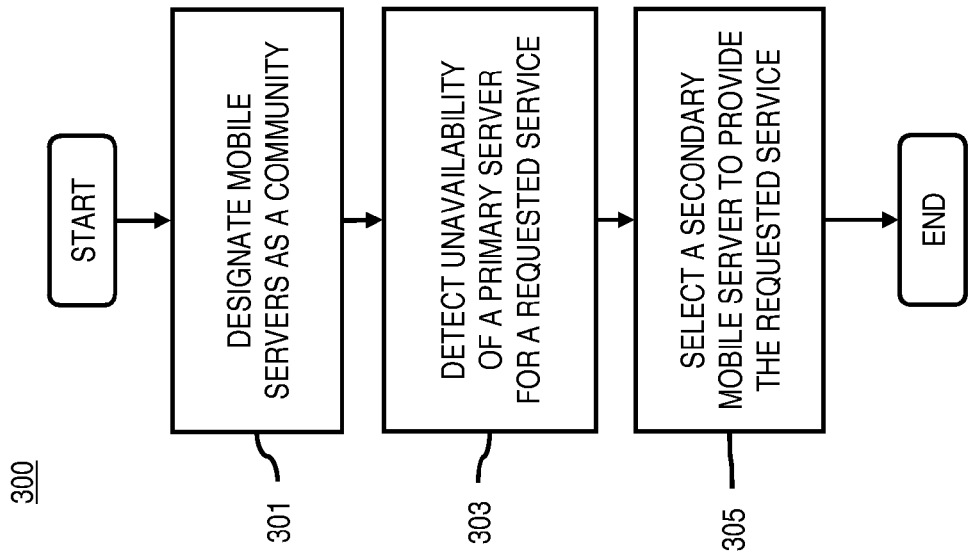
FIG. 3 is a flowchart of a process for providing shared services, according to an exemplary embodiment.

FIG. 3 is a flowchart of a process for providing shared services, according to an exemplary embodiment. In one embodiment, the gateway 103 performs process 300 and is implemented in, for instance, a chip set including a processor and a memory as shown FIG. 9. In step 301, the process 300 designates multiple mobile servers (e.g., UEs 101a-101n) as a community for sharing a web service. During the step of designating a community, the gateway 103 also designates, for instance, a primary mobile server for the web service and one or more secondary servers. In exemplary embodiments, the mobile server (e.g., UE 109a) making an initial request for sharing the web service is designated the primary server. It is contemplated that users may manually designate the primary and secondary servers as well. This manual designation may be made at the initial setup of the web service or at any later time.

In exemplary embodiments, the primary server, by default, is the first to receive a request directed to the web service. Accordingly, on receipt of a service request, the gateway 103 detects whether the primary server is available to provide the shared service (step 303). The primary server available depends, for example, on a variety of factors including the primary server's current load (e.g., processor load, network traffic load), any distribution rules (e.g., a rule directing the service request to another mobile server), and whether the primary server is connected to the network 105. For example, by assessing the load (e.g., processor, network traffic, etc.) on the primary server (or alternatively any of the primary or secondary servers), the gateway 103 may designate a primary server as unavailable and distribute the service request to secondary services to perform load-balancing and make more efficient use of network resources. If the primary server is available, the gateway 103 directs the service request to the primary server. If the primary server is unavailable (e.g., based on load or other factors), the gateway 103 directs the service request to a secondary server (step 305).

Certain embodiments include the process 300 within a network-enabled computing platform (e.g., hardware such as a computer, server, etc.). The incorporation of the process 300 within the computing platform extends these functions to the network or communication system 105 in which the computing platform operates.

Figure 4:
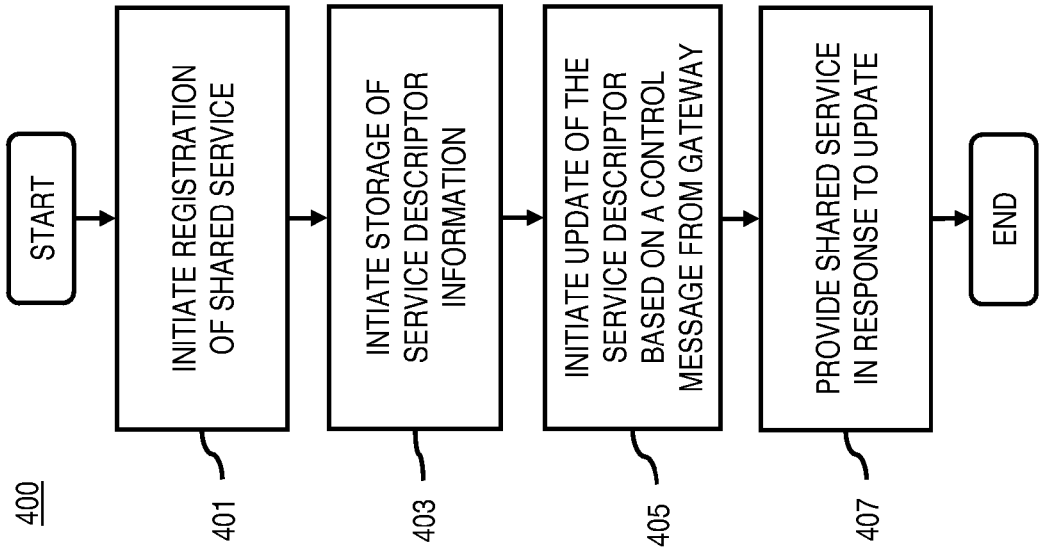
FIG. 4 is a flowchart of a process for providing a shared mobile web service, according to an exemplary embodiment.

FIG. 4 is a flowchart of a process for providing a shared mobile web service, according to an exemplary embodiment. In one embodiment, the shared services module 109 performs the process 400 and is implemented in, for instance, a chip set including a processor and a memory as shown FIG. 9. The example of FIG. 4 assumes that the web service has already been installed on a mobile server (e.g., UE 101). In step 401, the shared services module 109 initiates registration of the shared web service with the gateway 103. In exemplary embodiments, the initiation of the registration is triggered automatically on installation of the shared web service on the mobile server. In other embodiments, the registration step may be configured to occur manually. The shared services module 109 then stores the service descriptor associated with the shared service (step 403). As described with respect to FIG. 1, the service descriptor, for instance, includes a list of service items (e.g., files, logs, scripts, etc. associated with the service), a list of dependencies (i.e., additional services or modules that are installed with the service), and configuration settings.

Periodically, the services module 109 receives, for example, a control message from the gateway 103 to update or synchronize the service descriptor associated with a web service and initiates an update or synchronization as directed (step 405). Additionally, the shared services module 109 similarly provides its local copy of the service descriptor to the gateway 103 and other mobile servers running the shared web service (step 407). In exemplary embodiments, the shared web service is distributed among multiple mobile servers. Each multiple server may potentially update and/or provide the shared services per a user request. Over time, the data associated with the web service contained in the service descriptor may differ. Periodic updates and synchronization of the service descriptor among the mobile servers sharing the web service ensures that each mobile server has the latest data to provide the most up-to-date service.

As discussed previously, certain embodiments include the shared services module 111 within the UEs 101a-101n (e.g., hardware such as a wireless handset, etc.). The incorporation of the module 111 within the UEs 101a-101n extends the functions of the module 111 to the network or communication system 105 in which the UE 101 operates.

Figure 5:
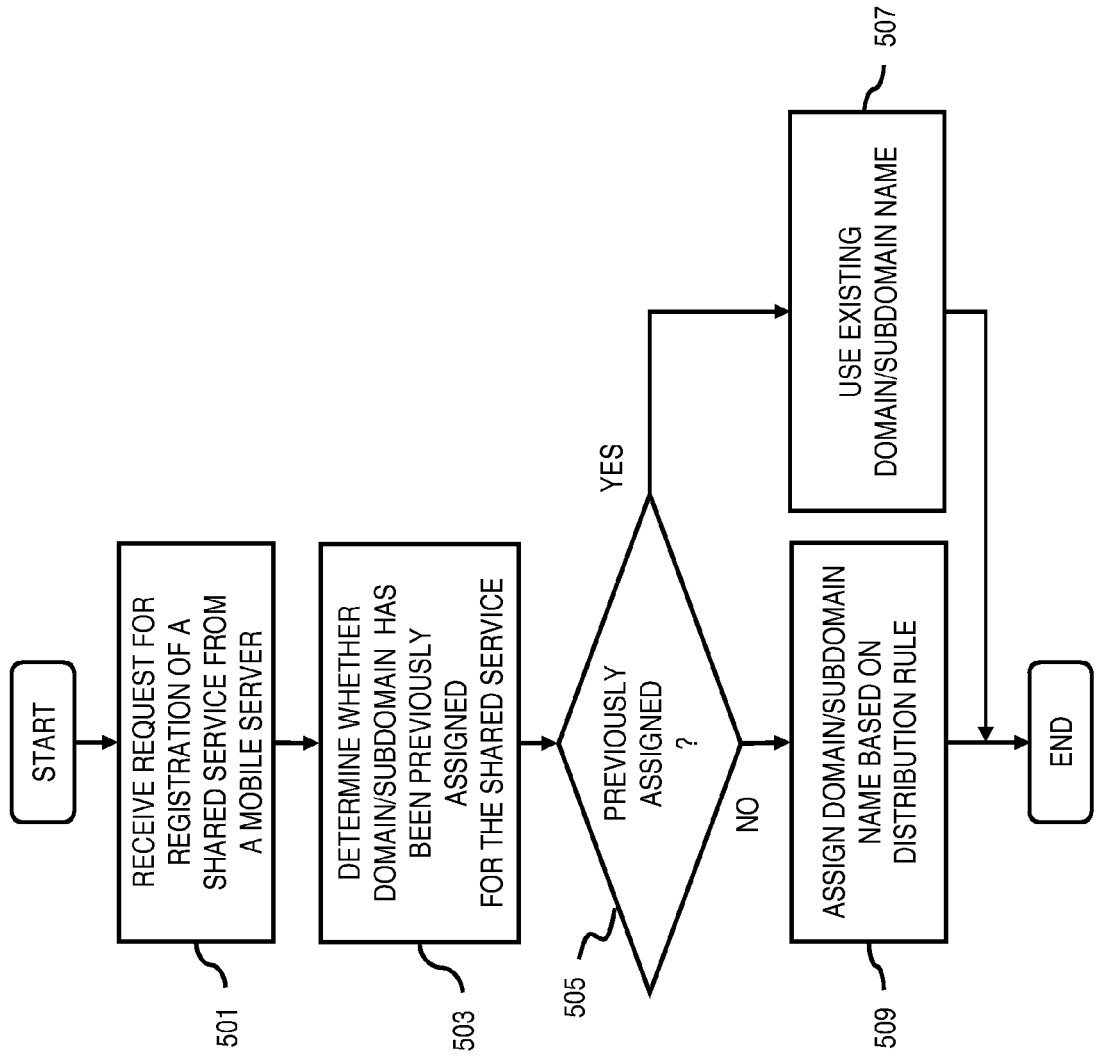
FIG. 5 is a flowchart of a process for registering a mobile web service, according to an exemplary embodiment.

FIG. 5 is a flowchart of a process for registering a mobile web service, according to an exemplary embodiment. In step 501, the gateway 103 receives a request for registration of a shared web service from a mobile server (e.g., UE 101). The request includes, for example, a service descriptor, distribution list 205, and distribution rule 207 for the shared service. As discussed previously, the distribution rule 207 provides direction for how the DDNS service 111 should register the service (e.g., whether to create a new domain or subdomain). On receipt of the request, the gateway 103 determines whether a domain or subdomain has previously been assigned to the shared service (steps 503 and 505). If there is an existing domain or subdomain, the gateway 103 uses the existing name (step 507). If there is not, the gateway 103 assigns a new domain or subdomain name based on the associated distribution rule 207 (step 509).

For example, a family creates a new community 105 for sharing a web service. The family has not previously created any web service and is now requesting a movie booking web service for the family. In response, the gateway 103 determines whether is a domain assigned to web services associated with this particular community 105. In this case, there is no previously assigned domain or subdomain, and the DDNS service 111 assigns a new domain name (e.g., "family.com"). The DDNS service 111 then assigns a subdomain associated with the movie booking service (e.g., "movies.family.com").

FIGS. 6A and 6B are diagrams of a user interface utilized in the process of FIG. 5, according to an exemplary embodiment. In exemplary embodiments, the mobile web server (e.g., UE 101) is, for instance, a mobile handset with a limited display area. FIG. 6A depicts an initial menu screen 600 listing available menu options. By way of example, a user selects the "Open" menu option 601 to access a submenu 603 which contains an option to add a new web service. On selection of the add web service option 605, the user can be presented with, for instance, a list of available web services that can be installed on the UE 101.

FIG. 7 is a ladder diagram that illustrates a sequence of messages and processes for providing a shared web service, according to an exemplary embodiment. A network process on the network is represented by a thin vertical box. A message passed from one process to another is represented by horizontal arrows. A step performed by a process is indicated by a box or looping arrow overlapping the process at a time sequence indicated by the vertical position of the box or looping arrow.

The processes represented in FIG. 7 are a service provider 701, a service consumer 703, a service volunteer 705, and a gateway 103. The service provider 701 is an example of a primary mobile web server running a shared web service. The service consumer 703 is an example of a user of the shared web service. The service volunteer 705 is an example of a secondary mobile web server running a shared web service.

In response to a service deployment request 707, the service provider 701 installs and runs a web service. The installation process, for instance, includes initiating an action to share the web service 709 with the service volunteer 705. The service volunteer 705 then initiates setup of the service domain 711 (i.e., registration of the shared web service) with the gateway 103. The setup request 711 includes the service descriptor associated with the setup and identifies the mobile servers providing the shared web service (e.g., service provider 701 and service volunteer 705).

On receipt of the request, the gateway 103 tracks the new shared web service. The update process 713 includes creating a new domain or subdomain name for the web service (if required) according to the distribution rule 207 associated with the web service. At this point, the gateway 103 creates a community 105 for sharing the web service. The gateway 103 also updates the distribution list 205 to designate the service provider 701 as the primary server for the web service and the service volunteer 705 as the secondary server. The gateway 103 then transmits the updated service descriptor and distribution list 205 to the service 705 in a control message 715 and to the service provider 701 in a control message 717.

After the web service is setup, a service consumer 703 initiates a command 719 to connect to the web service. In this example, the service consumer 703 is a family member of a community 105 of other family members sharing a web service. The command 719 initiates a request 721 to the gateway 103 for connection to the web service run by service provider 701. The gateway 103 determines the service provider associated with the requested web service (i.e., service provider 701) and forwards the service request to the service provider 701 in message 723. At this point, the service provider 701 is not online and is unable to service the request. The gateway 103 detects that the service request 723 to the service provider 701 has timed out 725 and selects a secondary server (i.e., service volunteer 705) that is running the shared web service. The gateway 103 sends a control message 727 to service volunteer 705 forwarding the service request from service consumer 703. In response, the service volunteer 705 provides the requested service content 729 to the gateway 103 then forwards the service content to the service consumer 703 in a message 731.

After this initial exchange between service consumer 703 and service volunteer 705, the service provider 701 comes back online 733 and registers with the gateway 103 via control message 735. In the meantime, the exchange between service consumer 703 and service volunteer 705 continues with the service requesting volunteer requesting additional data from the service via a control message 737 to the gateway 103. Even though the primary service provider 701 is back online, the gateway 103 continues to forward the request from the ongoing session of the service consumer 703 to the service volunteer 705 via control message 739 because the service volunteer 705 was the first provider relative to the request of the service consumer 703. The service volunteer 705 then sends the requested additional data to the gateway 103 via control message 741. The gateway 103 completes the session by forwarding the data to the service consumer 703 via control message 743.

The described processes and arrangement advantageously, according to certain embodiments, provide for sharing of mobile web services.

The processes described herein for providing shared mobile web services may be implemented via software, hardware (e.g., general processor, Digital Signal Processing (DSP) chip, an Application Specific Integrated Circuit (ASIC), Field Programmable Gate Arrays (FPGAs), etc.), firmware or a combination thereof. Such exemplary hardware for performing the described functions is detailed below.

Figure 8:
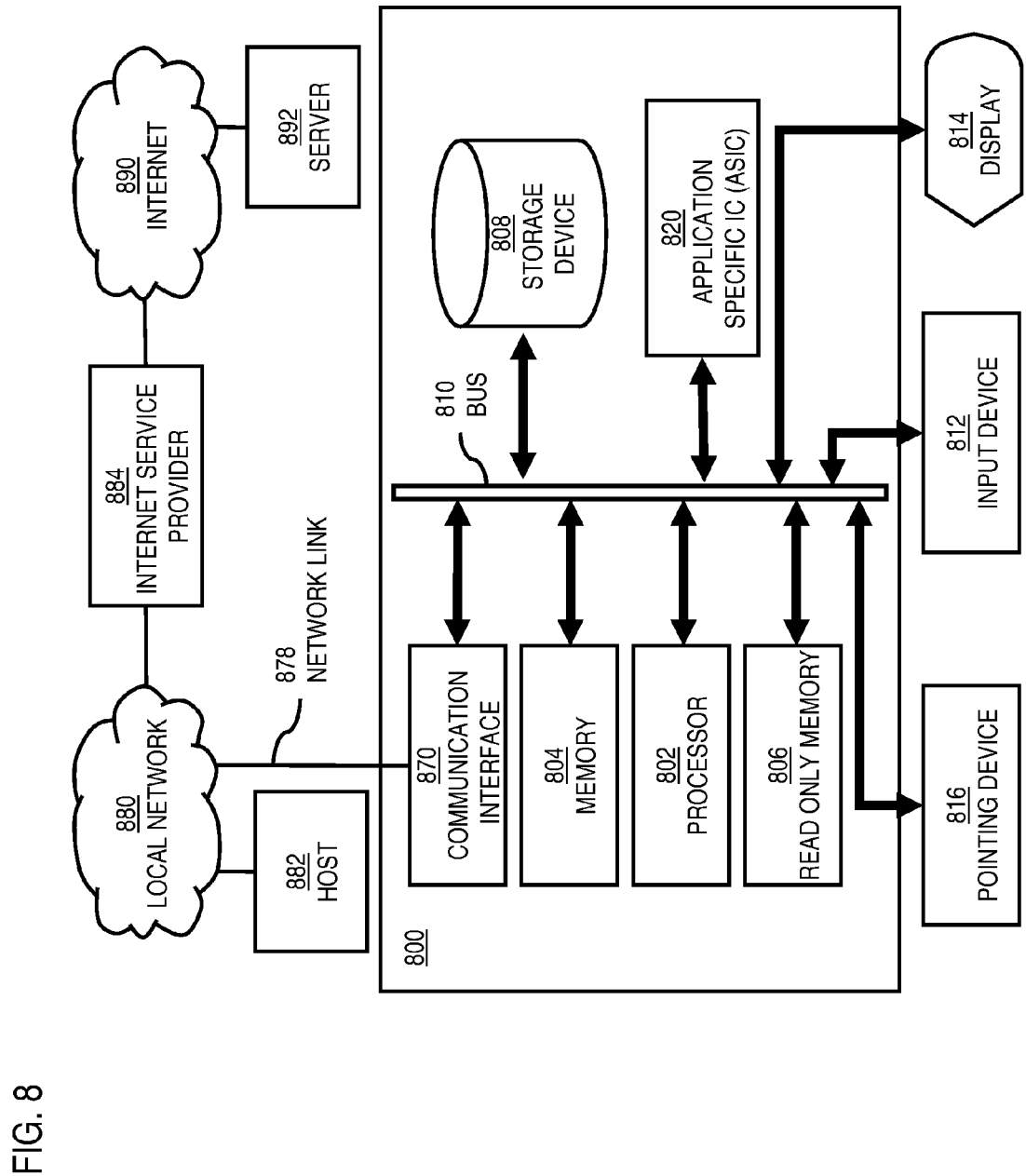
FIG. 8 is a diagram of hardware that can be used to implement an embodiment of the invention.

FIG. 8 illustrates a computer system 800 upon which an embodiment of the invention may be implemented. Computer system 800 is programmed to carry out the inventive functions described herein and includes a communication mechanism such as a bus 810 for passing information between other internal and external components of the computer system

800. Information (also called data) is represented as a physical expression of a measurable phenomenon, typically electric voltages, but including, in other embodiments, such phenomena as magnetic, electromagnetic, pressure, chemical, biological, molecular, atomic, sub-atomic and quantum interactions. For example, north and south magnetic fields, or a zero and non-zero electric voltage, represent two states (0, 1) of a binary digit (bit). Other phenomena can represent digits of a higher base. A superposition of multiple simultaneous quantum states before measurement represents a quantum bit (qubit). A sequence of one or more digits constitutes digital data that is used to represent a number or code for a character. In some embodiments, information called analog data is represented by a near continuum of measurable values within a particular range.

A bus 810 includes one or more parallel conductors of information so that information is transferred quickly among devices coupled to the bus 810. One or more processors 802 for processing information are coupled with the bus 810.

A processor 802 performs a set of operations on information. The set of operations include bringing information in from the bus 810 and placing information on the bus 810. The set of operations also typically include comparing two or more units of information, shifting positions of units of information, and combining two or more units of information, such as by addition or multiplication or logical operations like OR, exclusive OR (XOR), and AND. Each operation of the set of operations that can be performed by the processor is represented to the processor by information called instructions, such as an operation code of one or more digits. A sequence of operations to be executed by the processor 802, such as a sequence of operation codes, constitute processor instructions, also called computer system instructions or, simply, computer instructions. Processors may be implemented as mechanical, electrical, magnetic, optical, chemical or quantum components, among others, alone or in combination.

Computer system 800 also includes a memory 804 coupled to bus 810. The memory 804, such as a random access memory (RAM) or other dynamic storage device, stores information including processor instructions. Dynamic memory allows information stored therein to be changed by the computer system 800. RAM allows a unit of information stored at a location called a memory address to be stored and retrieved independently of information at neighboring addresses. The memory 804 is also used by the processor 802 to store temporary values during execution of processor instructions. The computer system 800 also includes a read only memory (ROM) 806 or other static storage device coupled to the bus 810 for storing static information, including instructions, that is not changed by the computer system 800. Some memory is composed of volatile storage that loses the information stored thereon when power is lost. Also coupled to bus 810 is a non-volatile (persistent) storage device 808, such as a magnetic disk, optical disk or flash card, for storing information, including instructions, that persists even when the computer system 800 is turned off or otherwise loses power.

Information, including instructions, is provided to the bus 810 for use by the processor from an external input device 812, such as a keyboard containing alphanumeric keys operated by a human user, or a sensor. A sensor detects conditions in its vicinity and transforms those detections into physical expression compatible with the measurable phenomenon used to represent information in computer system 800. Other external devices coupled to bus 810, used primarily for interacting with humans, include a display device 814, such as a cathode ray tube (CRT) or a liquid crystal display (LCD), or plasma screen or printer for presenting text or images, and a pointing device 816, such as a mouse or a trackball or cursor direction keys, or motion sensor, for controlling a position of a small cursor image presented on the display 814 and issuing commands associated with graphical elements presented on the display 814. In some embodiments, for example, in embodiments in which the computer system 800 performs all functions automatically without human input, one or more of external input device 812, display device 814 and pointing device 816 is omitted.

In the illustrated embodiment, special purpose hardware, such as an application specific integrated circuit (ASIC) 820, is coupled to bus 810. The special purpose hardware is configured to perform operations not performed by processor 802 quickly enough for special purposes. Examples of application specific ICs include graphics accelerator cards for generating images for display 814, cryptographic boards for encrypting and decrypting messages sent over a network, speech recognition, and interfaces to special external devices, such as robotic arms and medical scanning equipment that repeatedly perform some complex sequence of operations that are more efficiently implemented in hardware.

Computer system 800 also includes one or more instances of a communications interface 870 coupled to bus 810. Communication interface 870 provides a one-way or two-way communication coupling to a variety of external devices that operate with their own processors, such as printers, scanners and external disks. In general the coupling is with a network link 878 that is connected to a local network 880 to which a variety of external devices with their own processors are connected. For example, communication interface 870 may be a parallel port or a serial port or a universal serial bus (USB) port on a personal computer. In some embodiments, communications interface 870 is an integrated services digital network (ISDN) card or a digital subscriber line (DSL) card or a telephone modem that provides an information communication connection to a corresponding type of telephone line. In some embodiments, a communication interface 870 is a cable modem that converts signals on bus 810 into signals for a communication connection over a coaxial cable or into optical signals for a communication connection over a fiber optic cable. As another example, communications interface 870 may be a local area network (LAN) card to provide a data communication connection to a compatible LAN, such as Ethernet. Wireless links may also be implemented. For wireless links, the communications interface 870 sends or receives or both sends and receives electrical, acoustic or electromagnetic signals, including infrared and optical signals, that carry information streams, such as digital data. For example, in wireless handheld devices, such as mobile telephones like cell phones, the communications interface 870 includes a radio band electromagnetic transmitter and receiver called a radio transceiver.

The term computer-readable medium is used herein to refer to any medium that participates in providing information to processor 802, including instructions for execution. Such a medium may take many forms, including, but not limited to, non-volatile media, volatile media and transmission media. Non-volatile media include, for example, optical or magnetic disks, such as storage device 808. Volatile media include, for example, dynamic memory 804. Transmission media include, for example, coaxial cables, copper wire, fiber optic cables, and carrier waves that travel through space without wires or cables, such as acoustic waves and electromagnetic waves, including radio, optical and infrared waves. Signals include man-made transient variations in amplitude, frequency, phase, polarization or other physical properties transmitted through the transmission media. Common forms of computer-readable media include, for example, a floppy disk, a flexible disk, hard disk, magnetic tape, any other magnetic medium, a CD-ROM, CDRW, DVD, any other optical medium, punch cards, paper tape, optical mark sheets, any other physical medium with patterns of holes or other optically recognizable indicia, a RAM, a PROM, an EPROM, a FLASH-EPROM, any other memory chip or cartridge, a carrier wave, or any other medium from which a computer can read.

Figure 9:
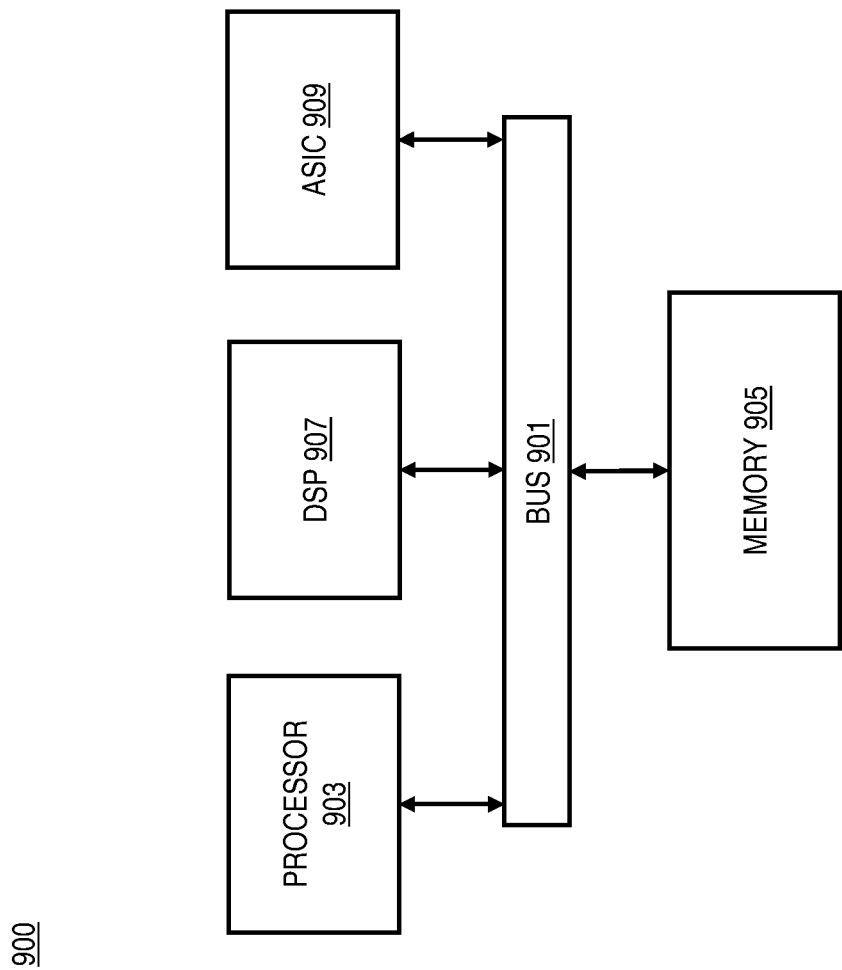
FIG. 9 is a diagram of a chip set that can be used to implement an embodiment of the invention.

FIG. 9 illustrates a chip set 900 upon which an embodiment of the invention may be implemented. Chip set 900 is programmed to carry out the inventive functions described herein and includes, for instance, the processor and memory components described with respect to FIG. 8 incorporated in one or more physical packages. By way of example, a physical package includes an arrangement of one or more materials, components, and/or wires on a structural assembly (e.g., a baseboard) to provide one or more characteristics such as physical strength, conservation of size, and/or limitation of electrical interaction.

In one embodiment, the chip set 900 includes a communication mechanism such as a bus 901 for passing information among the components of the chip set 900. A processor 903 has connectivity to the bus 901 to execute instructions and process information stored in, for example, a memory 905. The processor 903 may include one or more processing cores with each core configured to perform independently. A multi-core processor enables multiprocessing within a single physical package. Examples of a multi-core processor include two, four, eight, or greater numbers of processing cores. Alternatively or in addition, the processor 903 may include one or more microprocessors configured in tandem via the bus 901 to enable independent execution of instructions, pipelining, and multithreading. The processor 903 may also be accompanied with one or more specialized components to perform certain processing functions and tasks such as one or more digital signal processors (DSP) 907, or one or more application-specific integrated circuits (ASIC) 909. A DSP 907 typically is configured to process real-word signals (e.g., sound) in real time independently of the processor 903. Similarly, an ASIC 909 can be configured to performed specialized functions not easily performed by a general purposed processor. Other specialized components to aid in performing the inventive functions described herein include one or more field programmable gate arrays (FPGA) (not shown), one or more controllers (not shown), or one or more other special-purpose computer chips.

The processor 903 and accompanying components have connectivity to the memory 905 via the bus 901. The memory 905 includes both dynamic memory (e.g., RAM, magnetic disk, writable optical disk, etc.) and static memory (e.g., ROM, CD-ROM, etc.) for storing executable instructions that when executed perform the inventive steps described herein. The memory 905 also stores the data associated with or generated by the execution of the inventive steps.

Figure 10:
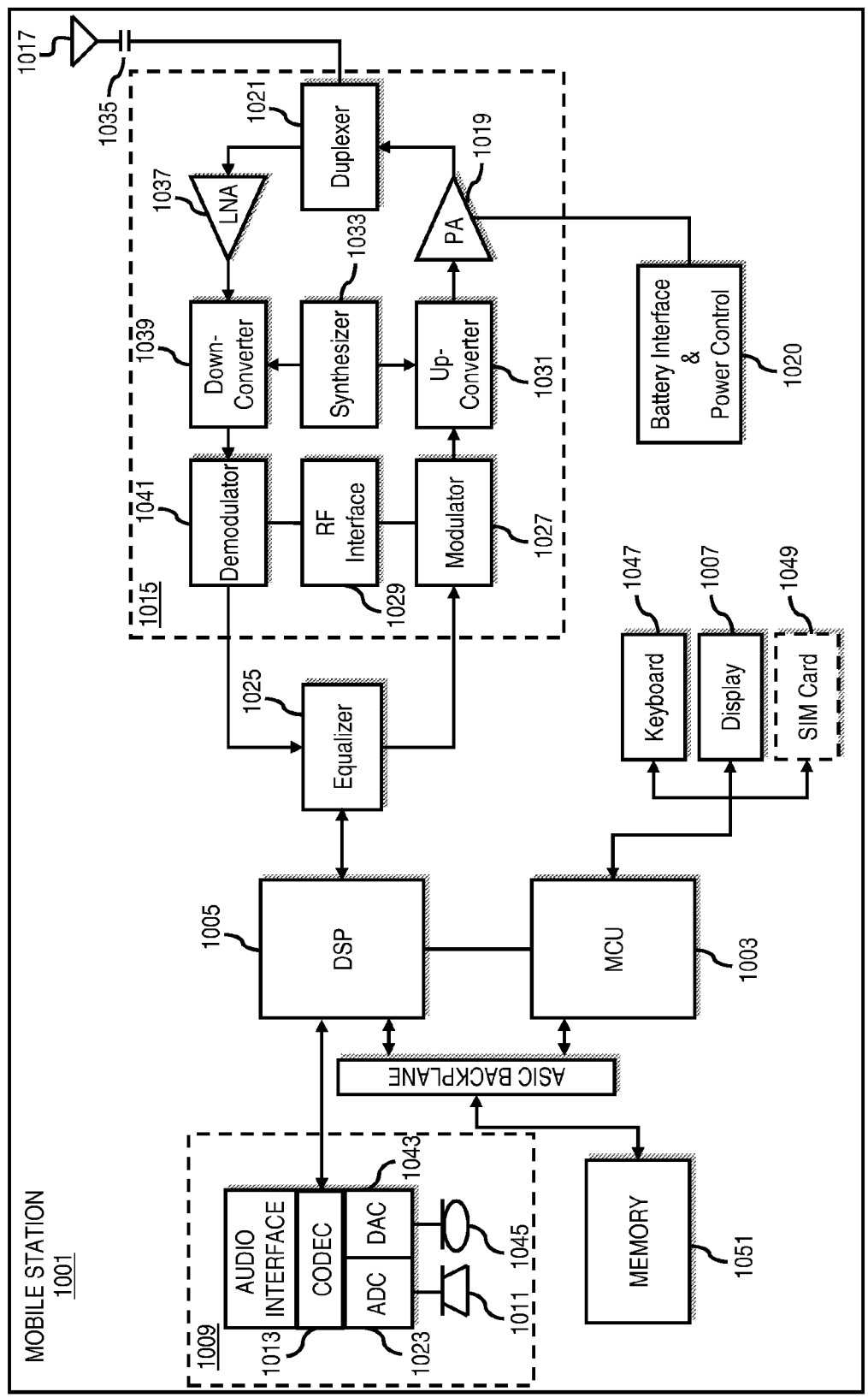
FIG. 10 is a diagram of a mobile station (e.g., handset) that can be used to implement an embodiment of the invention.

FIG. 10 is a diagram of exemplary components of a mobile station (e.g., handset) capable of operating in the system of FIG. 1, according to an exemplary embodiment. Generally, a radio receiver is often defined in terms of front-end and back-end characteristics. The front-end of the receiver encompasses all of the Radio Frequency (RF) circuitry whereas the back-end encompasses all of the base-band processing circuitry. Pertinent internal components of the telephone include a Main Control Unit (MCU) 1003, a Digital Signal Processor (DSP) 1005, and a receiver/transmitter unit including a microphone gain control unit and a speaker gain control unit. A main display unit 1007 provides a display to the user in support of various applications and mobile station functions. An audio function circuitry 1009 includes a microphone 1011 and microphone amplifier that amplifies the speech signal output from the microphone 1011. The amplified speech signal output from the microphone 1011 is fed to a coder/decoder (CODEC) 1013.

A radio section 1015 amplifies power and converts frequency in order to communicate with a base station, which is included in a mobile communication system, via antenna 1017. The power amplifier (PA) 1019 and the transmitter/modulation circuitry are operationally responsive to the MCU 1003, with an output from the PA 1019 coupled to the duplexer 1021 or circulator or antenna switch, as known in the art. The PA 1019 also couples to a battery interface and power control unit 1020.

In use, a user of mobile station 1001 speaks into the microphone 1011 and his or her voice along with any detected background noise is converted into an analog voltage. The analog voltage is then converted into a digital signal through the Analog to Digital Converter (ADC) 1023. The control unit 1003 routes the digital signal into the DSP 1005 for processing therein, such as speech encoding, channel encoding, encrypting, and interleaving. In the exemplary embodiment, the processed voice signals are encoded, by units not separately shown, using a cellular transmission protocol such as global evolution (EDGE), general packet radio service (GPRS), global system for mobile communications (GSM), Internet protocol multimedia subsystem (IMS), universal mobile telecommunications system (UMTS), etc., as well as any other suitable wireless medium, e.g., microwave access (WiMAX), Long Term Evolution (LTE) networks, code division multiple access (CDMA), wireless fidelity (WiFi), satellite, and the like.

The encoded signals are then routed to an equalizer 1025 for compensation of any frequency-dependent impairments that occur during transmission though the air such as phase and amplitude distortion. After equalizing the bit stream, the modulator 1027 combines the signal with a RF signal generated in the RF interface 1029. The modulator 1027 generates a sine wave by way of frequency or phase modulation. In order to prepare the signal for transmission, an up-converter 1031 combines the sine wave output from the modulator 1027 with another sine wave generated by a synthesizer 1033 to achieve the desired frequency of transmission. The signal is then sent through a PA 1019 to increase the signal to an appropriate power level. In practical systems, the PA 1019 acts as a variable gain amplifier whose gain is controlled by the DSP 1005 from information received from a network base station. The signal is then filtered within the duplexer 1021 and optionally sent to an antenna coupler 1035 to match impedances to provide maximum power transfer. Finally, the signal is transmitted via antenna 1017 to a local base station. An automatic gain control (AGC) can be supplied to control the gain of the final stages of the receiver. The signals may be forwarded from there to a remote telephone which may be another cellular telephone, other mobile phone or a land-line connected to a Public Switched Telephone Network (PSTN), or other telephony networks.

Voice signals transmitted to the mobile station 1001 are received via antenna 1017 and immediately amplified by a low noise amplifier (LNA) 1037. A down-converter 1039 lowers the carrier frequency while the demodulator 1041 strips away the RF leaving only a digital bit stream. The signal then goes through the equalizer 1025 and is processed by the DSP 1005. A Digital to Analog Converter (DAC) 1043 converts the signal and the resulting output is transmitted to the user through the speaker 1045, all under control of a Main Control Unit (MCU) 1003—which can be implemented as a Central Processing Unit (CPU) (not shown).

The MCU 1003 receives various signals including input signals from the keyboard 1047. The MCU 1003 delivers a display command and a switch command to the display 1007 and to the speech output switching controller, respectively. Further, the MCU 1003 exchanges information with the DSP 1005 and can access an optionally incorporated SIM card 1049 and a memory 1051. In addition, the MCU 1003 executes various control functions required of the station. The DSP 1005 may, depending upon the implementation, perform any of a variety of conventional digital processing functions on the voice signals. Additionally, DSP 1005 determines the background noise level of the local environment from the signals detected by microphone 1011 and sets the gain of microphone 1011 to a level selected to compensate for the natural tendency of the user of the mobile station 1001.

The CODEC 1013 includes the ADC 1023 and DAC 1043. The memory 1051 stores various data including call incoming tone data and is capable of storing other data including music data received via, e.g., the global Internet. The software module could reside in RAM memory, flash memory, registers, or any other form of writable storage medium known in the art. The memory device 1051 may be, but not limited to, a single memory, CD, DVD, ROM, RAM, EEPROM, optical storage, or any other non-volatile storage medium capable of storing digital data.

An optionally incorporated SIM card 1049 carries, for instance, important information, such as the cellular phone number, the carrier supplying service, subscription details, and security information. The SIM card 1049 serves primarily to identify the mobile station 1001 on a radio network. The card 1049 also contains a memory for storing a personal telephone number registry, text messages, and user specific mobile station settings.

While the invention has been described in connection with a number of embodiments and implementations, the invention is not so limited but covers various obvious modifications and equivalent arrangements, which fall within the purview of the appended claims. Although features of the invention are expressed in certain combinations among the claims, it is contemplated that these features can be arranged in any combination and order.

What is claimed is:

1. A non-transitory computer-readable storage medium carrying one or more sequences of one or more instructions which, when executed by one or more processors, cause the one or more processors to at least perform the following steps:
designating a plurality of mobile servers as a community for sharing a service, wherein the shared service is provided by one of the mobile servers designated as a primary server, the plurality of mobile servers in the community synchronized such that each mobile server stores the latest data to redundantly provide the shared service, and the primary server being selected first to provide the shared service to the community;
detecting unavailability of the primary server to provide the shared service; and
selecting another one of the mobile servers in the community as a secondary server to provide the shared service,
wherein the service descriptor includes a set of files corresponding to the services, a distribution list specifying which ones of the services are temporarily disabled, and a distribution rule specifying one or more rules relating to how the shared service is provided.

2. A non-transitory computer readable storage medium of claim 1, wherein each of the mobile servers is configured to provide a plurality of services including the shared service, and to maintain a service descriptor to specify data relating to the services.

3. A non-transitory computer readable storage medium of claim 1, wherein the one or more processors are caused to perform steps further comprising:
initiating creation of a subdomain for the community using the distribution rule.

4. A non-transitory computer readable storage medium of claim 3, wherein the one or more processors are caused to perform steps further comprising:
initiating a dynamic domain name service process to create the subdomain.

5. A non-transitory computer readable storage medium of claim 1, wherein the one or more processors are caused to perform steps further comprising:
initiating load balancing among the mobile servers of the community for the shared service.

6. The non-transitory computer-readable storage medium of claim 1 wherein the status is one of enabled and disabled.

7. The non-transitory computer-readable storage medium of claim 1 further comprising:
determining the status of one of the plurality of mobile servers; and
updating the status to disabled if the determined status indicates the mobile server is not available.

8. The non-transitory computer-readable storage medium of claim 1 further comprising:
determining the status of one of the plurality of mobile servers; and
updating the status to enabled if the determined status indicates the mobile server is available.

9. An apparatus comprising:
at least one processor; and
at least one memory including computer program code for one or more programs,
the at least one memory and the computer program code configured to, with the at least one processor, cause the apparatus to at least perform the following:
designating a plurality of mobile servers as a community for sharing a service, wherein the shared service is provided by one of the mobile servers designated as a primary server, the plurality of mobile servers in the community synchronized such that each mobile server stores the latest data to redundantly provide the shared service, and the primary server being selected first to provide the shared service to the community;
detecting unavailability of the primary server to provide the shared service; and
selecting another one of the mobile servers in the community as a secondary server to provide the shared service,
wherein the service descriptor includes a set of files corresponding to the services, a distribution list specifying which ones of the services are temporarily disabled, and a distribution rule specifying one or more rules relating to how the shared service is provided.

10. An apparatus of claim 9, wherein each of the mobile servers is configured to provide a plurality of services including the shared service, and to maintain a service descriptor to specify data relating to the services.

11. An apparatus of claim 9, wherein the processor and the memory are further configured to initiate creation of a subdomain for the community using the distribution rule.

12. An apparatus of claim 11, wherein the processor and the memory are further configured to initiate a dynamic domain name service process to create the subdomain.

13. An apparatus of claim 9, wherein the processor and the memory are further configured to initiate load balancing among the mobile servers of the community for the shared service.

14. A system comprising an apparatus of claim 9, the system further comprising: a base station configured to communicate with the mobile servers.

15. The apparatus of claim 9 wherein the status is one of enabled and disabled.

16. The apparatus of claim 9 further configured to at least perform the following:
   determine the status of one of the plurality of mobile servers; and
   update the status to disabled if the determined status indicates the mobile server is not available.

17. The apparatus of claim 9 further configured to at least perform the following:
   determine the status of one of the plurality of mobile servers; and
   update the status to enabled if the determined status indicates the mobile server is available.

* * * * *

UNITED STATES PATENT AND TRADEMARK OFFICE
CERTIFICATE OF CORRECTION

PATENT NO. : 9,112,871 B2
APPLICATION NO. : 12/372620
DATED : August 18, 2015
INVENTOR(S) : Börzsei et al.

It is certified that error appears in the above-identified patent and that said Letters Patent is hereby corrected as shown below:

In the Claims

Claim 1, column 13, line 63, the word "the" has been replaced with the word -- a --;
Claim 2, column 14, line 4, the word "a" has been replaced with the word -- the --;
Claim 9, column 14, line 56, the word "the" has been replaced with the word -- a --;
Claim 10, column 14, line 63, the word "a" has been replaced with the word -- the --;
As shown below:

1.   A non-transitory computer-readable storage medium carrying one or more sequences of one or more instructions which, when executed by one or more processors, cause the one or more processors to at least perform the following steps:
designating a plurality of mobile servers as a community for sharing a service, wherein the shared service is provided by one of the mobile servers designated as a primary server, the plurality of mobile servers in the community synchronized such that each mobile server stores the latest data to redundantly provide the shared service, and the primary server being selected first to provide the shared service to the community; detecting unavailability of the primary server to provide the shared service; and
selecting another one of the mobile servers in the community as a secondary server to provide the shared service,
wherein a service descriptor includes a set of files corresponding to the services, a distribution list specifying which ones of the services are temporarily disabled, and a distribution rule specifying one or more rules relating to how the shared service is provided.

2.   A non-transitory computer readable storage medium of claim 1, wherein each of the mobile servers is configured to provide a plurality of services including the shared service, and to maintain the service descriptor to specify data relating to the services.

Signed and Sealed this
Fifth Day of July, 2016

Michelle K. Lee
*Director of the United States Patent and Trademark Office*

9. An apparatus comprising:
at least one processor; and
at least one memory including computer program code for one or more programs,
the at least one memory and the computer program code configured to, with the at least one processor, cause the apparatus to at least perform the following:
designating a plurality of mobile servers as a community for sharing a service, wherein the shared service is provided by one of the mobile servers designated as a primary server, the plurality of mobile servers in the community synchronized such that each mobile server stores the latest data to redundantly provide the shared service, and the primary server being selected first to provide the shared service to the community;
detecting unavailability of the primary server to provide the shared service; and
selecting another one of the mobile servers in the community as a secondary server to provide the shared service,
wherein a service descriptor includes a set of files corresponding to the services, a distribution list specifying which ones of the services are temporarily disabled, and a distribution rule specifying one or more rules relating to how the shared service is provided.

10. An apparatus of claim 7, wherein each of the mobile servers is configured to provide a plurality of services including the shared service, and to maintain the service descriptor to specify data relating to the services.